United States Patent
Bitner et al.

(10) Patent No.: US 7,853,764 B2
(45) Date of Patent: Dec. 14, 2010

(54) TAPE STORAGE EMULATION FOR OPEN SYSTEMS ENVIRONMENTS

(75) Inventors: Haim Bitner, Raanana (IL); Samuel Krikler, Tel-Aviv (IL); Shay Akirav, Ramat-Gan (IL); Shira Bash, Westen Galilee (IL); Elena Drobchenko, Raanana (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/338,313

(22) Filed: Jan. 23, 2006

(65) Prior Publication Data

US 2006/0123189 A1 Jun. 8, 2006

Related U.S. Application Data

(63) Continuation of application No. 10/358,350, filed on Feb. 5, 2003, now abandoned.

(51) Int. Cl.
*G06F 13/00* (2006.01)
(52) U.S. Cl. .................. 711/161; 711/111; 709/219
(58) Field of Classification Search ........... 711/111, 711/161, 162; 709/219
See application file for complete search history.

(56) References Cited

U.S. PATENT DOCUMENTS

| 6,304,798 | B1 | 10/2001 | Carpenter | |
| 6,324,497 | B1 * | 11/2001 | Yates et al. | 703/24 |
| 6,490,648 | B1 | 12/2002 | Kaneda et al. | |
| 7,200,546 | B1 * | 4/2007 | Nourmohamadian et al. | 703/24 |
| 2003/0004980 | A1 * | 1/2003 | Kishi et al. | 707/204 |
| 2004/0111251 | A1 * | 6/2004 | Trimmer et al. | 703/26 |

FOREIGN PATENT DOCUMENTS

| JP | 2000/020247 | 1/2000 |
| WO | 02/27462 A1 | 4/2002 |

OTHER PUBLICATIONS

Extended EP Search Report in corresponding European Application No. 0705121.9-1245 mailed Aug. 3, 2007.
European Office Action Summary from European Application No. 07 075 121.9-1245 mailed on Jun. 16, 2009.

* cited by examiner

*Primary Examiner*—Jared I Rutz
(74) *Attorney, Agent, or Firm*—Zilka-Kotab, PC

(57) ABSTRACT

A Virtual Tape (VT) server residing on a network is connectible on its front end to a plurality of heterogeneous backup hosts, with different operating systems and/or backup applications, and on its back end to one or more disk storage devices in an open systems environment. The VT server responds to tape storage commands sent by the backup host as if it were the intended tape storage device and then emulates the desired tape storage activity on the one or more disk storage devices. In a described implementation, the host and server act as SCSI initiator and target and communicate over a Fibre Channel connection.

23 Claims, 15 Drawing Sheets

… … …

TAPE STORAGE EMULATION FOR OPEN SYSTEMS ENVIRONMENTS

TECHNICAL FIELD

The present invention relates to systems and methods for emulating tape storage.

BACKGROUND

Data backup is an essential element of the data protection process in every organization. Historically it has involved sending a backup copy of the data to a tape storage device. Exponential data growth, a shrinking backup window, heterogeneous platforms and applications (an open systems environment), and rising downtime costs are some of the data storage challenges facing IT administrators today. As a result, data backup is now typically the number one storage problem for IT administrators.

A traditional backup system architecture 10, shown in FIG. 1, has a backup application 12 residing on a backup server 14 and acting as the point of management and control for both the backup process and associated tape hardware. Backup server 14 is typically disposed on a local area network (LAN) 16, where it is connected to a plurality of local hosts (e.g., PC's and other servers (not shown) requiring data backup) and to a tape library 18. However, a variety of different backup applications are now available from various vendors, each compatible with different operating systems, storage systems and applications. Integrating these various backup applications into an open systems environment, with heterogeneous hosts and heterogeneous tape storage systems, is a significant challenge.

Apart from the difficulties of integrating the different systems, backup and recovery from tape is itself an inherently labor-intensive, complex and error prone process. The success rate for tape backup varies between 95 and 99%; for tape recovery, a less frequent but very critical operation, it is even lower. The operational costs related to tape backup and recovery management keep rising as the complexity of the system and the amount of data increase.

As a result of these problems, new data protection schemes have been proposed. One approach is to integrate disk-based cache (an expensive form of temporary storage typically used for application data) to improve backup performance and reduce recovery time. Another approach is to utilize disk-based library storage for data backup, this too being a more expensive alternative than tape storage. Some systems emulate a tape storage device with a disk storage device. In one such emulation system, commonly used in a mainframe (dedicated host and storage device) environment, tape requests are intercepted in the host server and converted to disk requests so that an unmodified magnetic disk storage device can emulate (act as a virtual) magnetic tape storage device.

While solving some of the problems of traditional tape-based backup and recovery methods, these new approaches have generated problems of their own. Many of these new approaches do not integrate seamlessly into the variety of existing backup applications and procedures of open systems environments. Some approaches require new systems hardware, as well as software. Others are too expensive, requiring additional disk space in primary (expensive, high performance) storage disk arrays. Furthermore, many of these approaches do not consolidate the backup data procedures, but rather are niche solutions suited to only a portion of the data handled by a data center.

Whereas tape storage has been central to data backup, disk storage has been central to applications storage (i.e., primary storage), which requires more immediate access to data. Thus, traditional disk arrays have been optimized for application storage performance. These storage arrays include RAID architectures for data availability, redundant support systems for reliability of the full data array, wide band channels to support high throughput, and caching to reduce input/output (I/O) latency. Because of their criticality to systems operation, applications storage arrays are also designed with redundant components (including the disks themselves) that can be removed and replaced without interrupting systems operation (referred to as "hot swap" capability). As a result of their increased complexity, application storage arrays typically cost at least ten times the amount of raw disk space.

For most data protection applications, and specifically for backup, many of these design complexities are not required. Additionally, while application storage systems must be designed so that the full data array is available at all times, most data protection applications require only a small fraction (e.g., ten percent or less) of the data to be active at any time.

FIG. 2 illustrates an enhanced backup architecture 20 which includes both disk and tape storage. In this schematic drawing, a plurality of hosts 21 (e.g., computers) are connected by a LAN 22. A plurality of servers 24, e.g., application server 25, e-mail server 26, web server 27, and backup server 28 on which backup application 29 resides, are connected by a Storage Area Network (SAN) 30, and to LAN 22. Data paths 32, 34, 35 exist between backup server 28 and each of disk library 38, which serves as a target for backup data, and tape library 36, which serves as a target for archive data. Systems of this type have been implemented ad hoc to reduce backup times and/or to increase the confidence and completion (success rate) of backup within a given backup window. However, the ability to scale such an architecture is limited, particularly in open systems environments which include a variety of different vendors' equipment.

Thus, there is a need to provide a backup data protection system having a more cost-effective combination of some (and preferably all) of the following characteristics: capacity; performance; availability; cost; compatibility; simplicity; and scalability.

SUMMARY

In various system and method implementations consistent with the invention, a virtual tape storage computer (a VT server) residing on a network has a front end connectable to a plurality of hosts, on which data storage backup application (s) reside, and a back end connectable to one or more disk storage devices. The VT server is operable in an open systems environment which allows, as described herein, simultaneous connectivity to multiple heterogeneous backup hosts, e.g., with different operating systems and/or backup applications. The hosts initiate data backup commands intended for tape storage devices, which commands are received by the VT server. The VT server responds as if it were the intended tape storage device and then emulates the desired tape storage activity on the one or more disk storage devices.

In one such implementation, a computer-implemented virtual tape storage system includes: a scalable front end connectible to a variable number of heterogeneous hosts in an open systems environment; a scalable back end connectible to a variable number of disk storage devices; and a target emulator and command converter which together accept tape storage commands from the hosts and implement the tape storage commands by emulating tape storage devices identified in the commands with the one or more of the disk storage devices.

In another implementation, a VT server receives and implements data storage commands and data sent by an initiator host; the commands and data are intended for a target tape storage device and are sent over a link or channel, such as a Fibre Channel (FC) connection. A VT program residing on the VT server includes a device driver which transparently accepts initiator storage commands (e.g., SCSI commands) intended for specific target tape storage devices (e.g., identified by a logical address). The VT program further includes a target emulator and a command converter which together confirm the validity of such storage commands and convert them to disk storage commands. Finally, the backup data (from the initiator host) and data describing the emulated tape device are stored in the one or more disk storage devices.

In another implementation, a system is provided for data backup including: a backup server and a virtual tape (VT) server connected in an open systems environment; the backup server including a backup application providing a single point of management and control for backup operations; and the VT server accepting and implementing backup commands received from the backup server, which implementation includes emulating one or more tape storage devices with one or more disk storage devices.

In another implementation, a method is provided for performing backup operations including: providing a backup server and a virtual tape (VT) server in an open systems environment, the VT server receiving from the backup server commands for tape storage and the VT server responding by emulating the requested tape storage with storage on one or more physical disk storage devices; and providing streaming of data intended for tape storage directly from one or more hosts to the one or more physical disk storage devices without storing the data in an intermediate cache disk storage device.

In another implementation, a method of emulating a tape storage device includes: sending a backup command for a designated tape storage device from a host to a virtual tape server over a network channel in an open systems environment; the server accepting the command as if it were the designated tape storage device and translating the command into a command for a disk storage device; storing/retrieving a data component of the command on/from the disk storage device; and recording the storage location for the stored data as an emulated tape storage device.

In another implementation, a method is provided for emulating tape storage including steps of: transparently accepting SCSI backup tape storage commands for designated tape storage devices from heterogeneous hosts over a network connection; storing data associated with the command(s) on a disk storage device; and recording a storage location for such data as an emulated tape storage device.

In another implementation, an apparatus is provided for emulating tape storage including at least one memory having program instructions, and at least one processor configured to execute the program instructions to perform the operations of: transparently accepting SCSI backup tape storage commands for designated tape storage devices from heterogeneous hosts over a network connection; storing data associated with the commands on a disk storage device; and recording a storage location for such data as an emulated tape storage device.

In another implementation, an apparatus is provided for emulating tape storage including: means for transparently accepting SCSI backup tape storage commands for designated tape storage devices from heterogeneous hosts over a network connection; means for storing data associated with the command(s) on a disk storage device; and means for recording a storage location for such data as an emulated tape storage device.

In another implementation, a computer-readable medium is provided containing instructions for controlling a computer system to perform a method for emulating tape storage, the method including: transparently accepting SCSI backup tape storage commands from heterogeneous hosts over a network connection; storing data associated with the command(s) on a disk storage device, and recording a storage location for such data as an emulated tape storage device.

In another implementation, a computer program is provided with instructions for implementing a method, the method including: accepting initiator commands from heterogeneous hosts in an open systems environment for backing up and restoring data; and implementing as a target the initiator commands by emulating one or more tape devices with one or more disk storage devices.

In the various implementations described in this application, the order of method steps or arrangement of apparatus elements provided is not limiting unless specifically designated as such.

DETAILED DESCRIPTION

Various implementations consistent with the invention will now be described. These methods and systems, which illustrate the invention, provide different combinations of benefits, for example in regard to capacity, performance, availability, cost, compatibility, simplicity and scalability.

Figure 1:
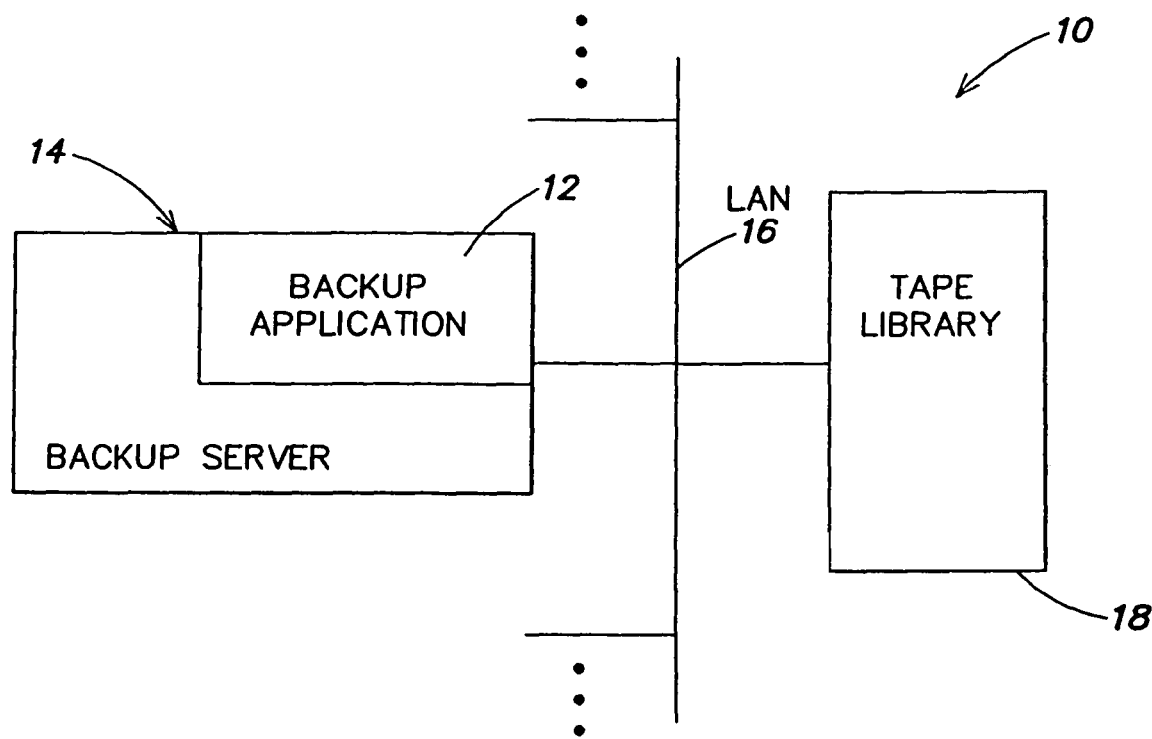
FIG. 1 is a schematic diagram of a prior art backup system architecture including a backup application residing on a backup server.
Figure 2:
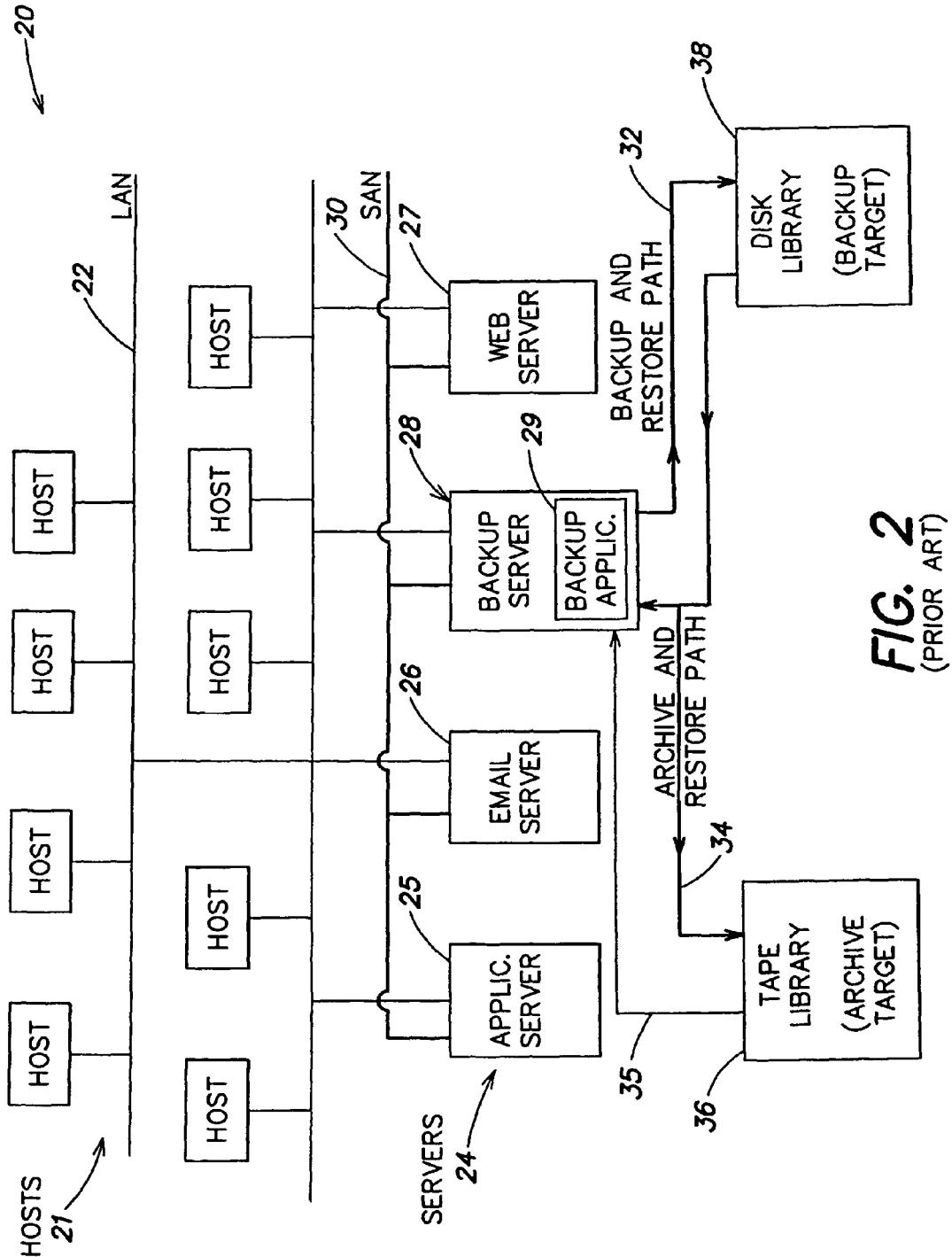
FIG. 2 is a schematic diagram of a more elaborate prior art backup architecture which includes both disk and tape storage devices.
Figure 3:
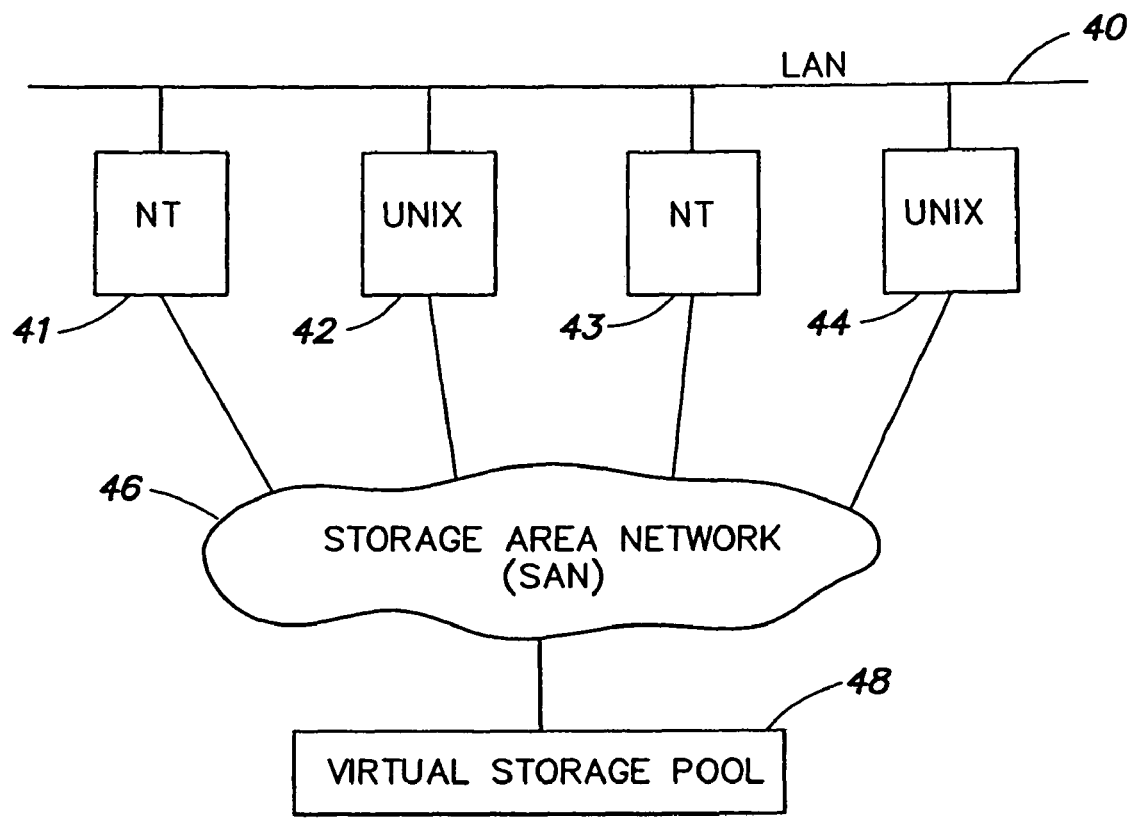
FIG. 3 is a schematic diagram of an implementation consistent with the invention which provides a virtual storage pool.

According to one implementation, FIG. 3 shows an open systems environment including a LAN network 40 connecting a plurality of mixed Unix and NT computer hosts 41, 42, 43, 44. These hosts are also connected to a Storage Area Network (SAN) 46, which comprises a shared network of storage devices. The SAN is connected to what is shown schematically as a "virtual storage pool" 48. This virtual storage pool includes disk-based storage devices and a system for utilizing the disk storage to emulate tape storage. The pool can be integrated seamlessly into an open systems backup and recovery environment. By "integrated seamlessly" it is meant that no significant changes (special software or configuration) are required to the host backup applications, drivers or other components of the IT infrastructure, including the disk-based storage devices.

The virtual storage pool can be implemented (in one example) with at least one Virtual Tape Library (VTL) server, described below, which receives backup tape commands from heterogeneous hosts and is connectable to one or more disk storage devices for transparently creating virtual pools of tape storage in disparate systems. It allows users to emulate various vendors' tape devices in the same storage pool. As used herein, tape device means a tape storage device such as a tape library, tape drive, or other tape-based storage apparatus. Specific examples include a Quantum™ DLT7000 tape drive, and an ATL P3000 automated tape library.

The VTL server allows multiple heterogeneous hosts, running different operating systems and different backup applications, to simultaneously connect to various vendors' disk devices. Disk device means a disk storage device such as a disk drive or disk array. Such disk devices are available from EMC™, HPT™, IBM™, etc., including ATA-based disk arrays (a new low-cost disk technology). A specific example of a disk array is the EMC Symmetrix™ 5.5.

When a backup application host sends a backup command, addressed to a specific tape storage device, the VTL server replies to the host as though it (the VTL server) were the addressed tape storage device, and then emulates the requested tape operation with one or more of the disk devices. Based on communications with the VTL server, the host believes that the backup transaction has taken place on the addressed tape storage device.

In this open systems environment, multiple hosts may be running multiple vendors' operating systems (e.g., UNIX, Windows NT). The hosts may also be running multiple vendors' backup applications (e.g., ArcServe™, NetBackup™, Networker™, TSM™). As used herein, a backup application provides tape management for backup and recovery functions.

Figure 4:
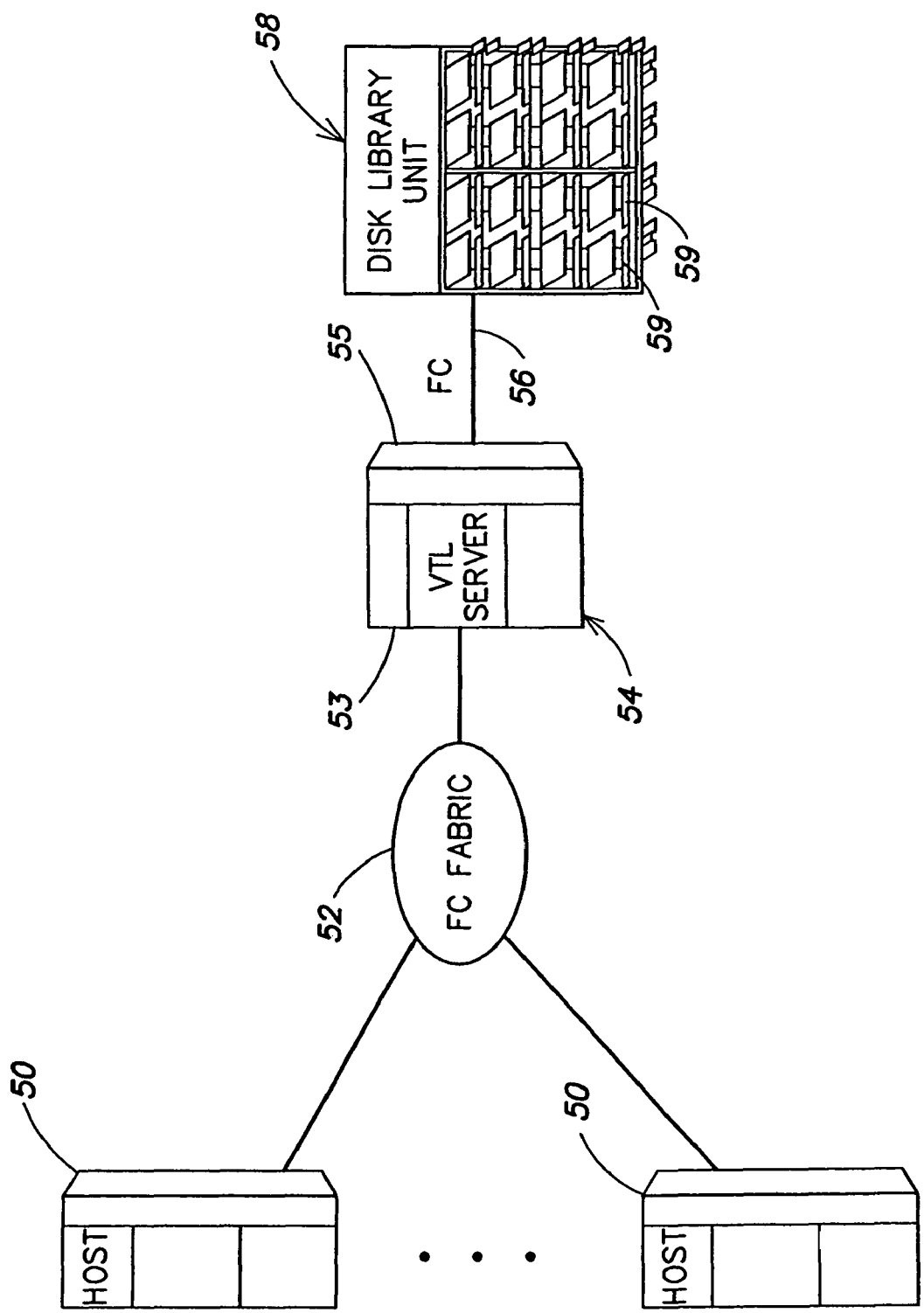
FIG. 4 is a schematic diagram of a network architecture for an implementation consistent with the invention, including a Virtual Tape Library (VTL) server and Disk Library Unit (DLU)

A more specific implementation of the virtual storage pool is illustrated in FIG. 4. FIG. 4 shows a plurality of hosts 50 connected by a Fibre Channel (FC) fabric 52 to a VTL server 54; the VTL server is in turn connected by Fibre Channel (FC) link 56 to an associated Disk Library Unit (DLU) 58. The "front end" 53 of the VTL server, which is connected by the Fibre Channel fabric 52 to the plurality of hosts 50, provides scalable connectivity to a plurality of host backup applications. The "back end" 55 of the VTL server is connected to DLU 58, which includes a plurality of disk-based storage devices or arrays 59.

Figure 5:
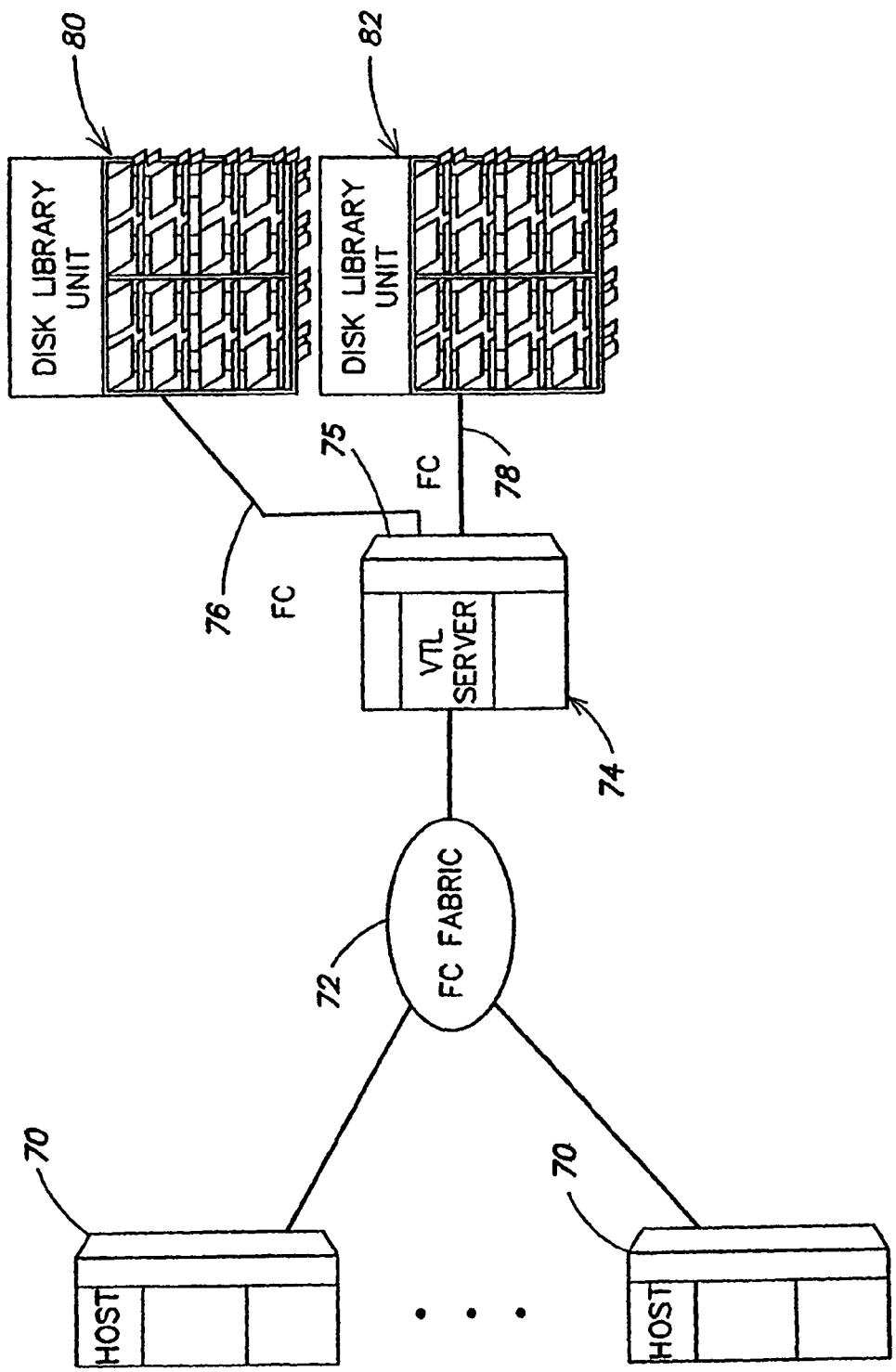
FIG. 5 is a schematic illustration of a network architecture for another implementation, having multiple Disk Library Units (DLUs)

In another implementation, illustrated in FIG. 5, a plurality of hosts 70 are again connected by a FC fabric 72 to a VTL server 74, but here the VTL server is connected on the back end by a plurality of Fibre Channels 76 and 78 to a plurality of DLUs 80, 82 (here two). In this example, the back end 75 of VTL Server 74 provides scalable connectivity and can utilize several DLU disk arrays in parallel.

Figure 6:
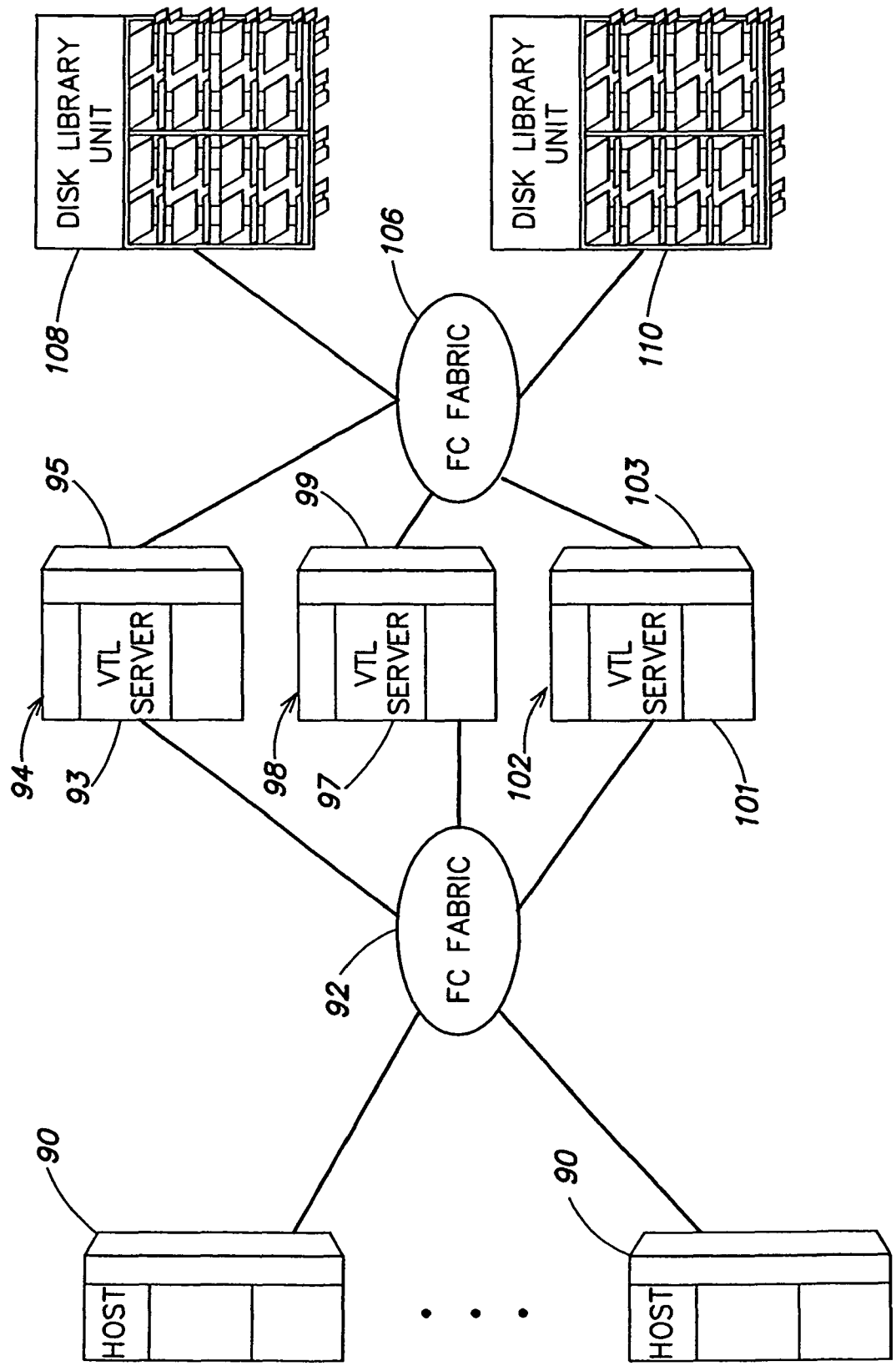
FIG. 6 is a schematic diagram of a network architecture for another implementation, having both multiple VTL servers and multiple DLUs.

In yet a further implementation, shown in FIG. 6, a plurality of hosts 90 are connected by FC fabric 92 to a plurality of VTL servers 94, 98, 102 (here three), which in turn are connected by FC fabric 106 to a plurality of disk library units 108, 110 (here two). In this example, scalable connectivity is provided at both the front ends 93, 97, 101 of each respective VTL server to the plurality of hosts 90, and at the back ends 95, 99, 103 of each respective VTL server to the plurality of DLUs 108, 110.

These implementations illustrate what may be referred to as "virtual tape data storage", among a variety of different hosts and a variety of different disk storage devices. This eliminates the need for dedicated drives, e.g. where a specific disk drive is allocated to a specific backup application host. In this example, data from one or more hosts can be simultaneously streamed to one or more VTL servers, and on to one or more disk devices emulating one or more tape devices.

In these examples, the VTL server provides a "virtual image" of a compatible tape storage device on its front end to the host(s). The VTL server also appears to be a compatible host on its back end to the disk storage device(s).

In these examples, data can be streamed directly from one or more hosts to the one or more physical storage disk drives or disk libraries. By "directly", it is meant that there is no intermediate hard disk array staging area, which additional storage system and step would tend to increase the cost and/or complexity of the system. Furthermore, there is no intermediate or second point of management and control added for backup operations. Rather, the backup application from the host continues to serve as a single point of management and control for backup operations. As used herein, backup operations includes both backup and recovery operations.

Furthermore, the implementations described above do not require additional disk space in primary (expensive, high performance) storage disk arrays.

Another benefit is that the VTL server can run on a standard off-the-shelf server, such as an Intel™-based Linux or UNIX server, e.g. Dell™ 4600, and Sun™ Solaris 5.8 servers.

The implementations described above are distinguishable from the prior art which utilizes hard disk array staging areas to improve backup performance and reduce time to data recovery. These prior art systems offload the actual backup transaction from the tape libraries onto the staging area, placing the backup data in, for example, RAID cache, to be transferred over to a tape library at a later specified time. Thus, instead of writing the data directly from the host to the storage device, they write the data to a high-speed RAID cache disk, wherein the data can later be written to another storage device at a time completely independent of the data being backed up, i.e., not within the backup window.

Also distinguishable are virtual tape servers used in the mainframe environment, sold for example by IBM™ and StorageTek™, which do not replace the tape library storage but enhance their functionality by providing intermediate disk cache acting as buffer to the tape drives and providing additional management capability for the tape library storage systems.

Instead, in one implementation consistent with the invention, the tape libraries are replaced by a Virtual Tape Library (VTL) unit which has a configurable number of virtual tape drives and virtual tape cartridges. The system can emulate both a Tape Library Unit (TLU) robotics and a configurable number of tape drive devices. It is configurable to meet a customer's needs, for example in regard to the number of virtual tape cartridges, virtual cartridge size, and protection level (RAID).

Furthermore, the VTL system includes a VTL server which emulates the tape drives and tape library units transparently. The VTL virtual tape drives can self identify, through a SCSI command (described in further detail below), as a SCSI tape drive device (e.g., whose vendor ID is Quantum and product ID is DLT7000). Similarly, the VTL virtual tape library unit can self identify through a SCSI command as a SCSI tape library unit (e.g., whose vendor ID is Quantum and product ID is ATL P3000). Thus, the VTL server appears to the host as the designated physical tape storage device.

Figure 7:
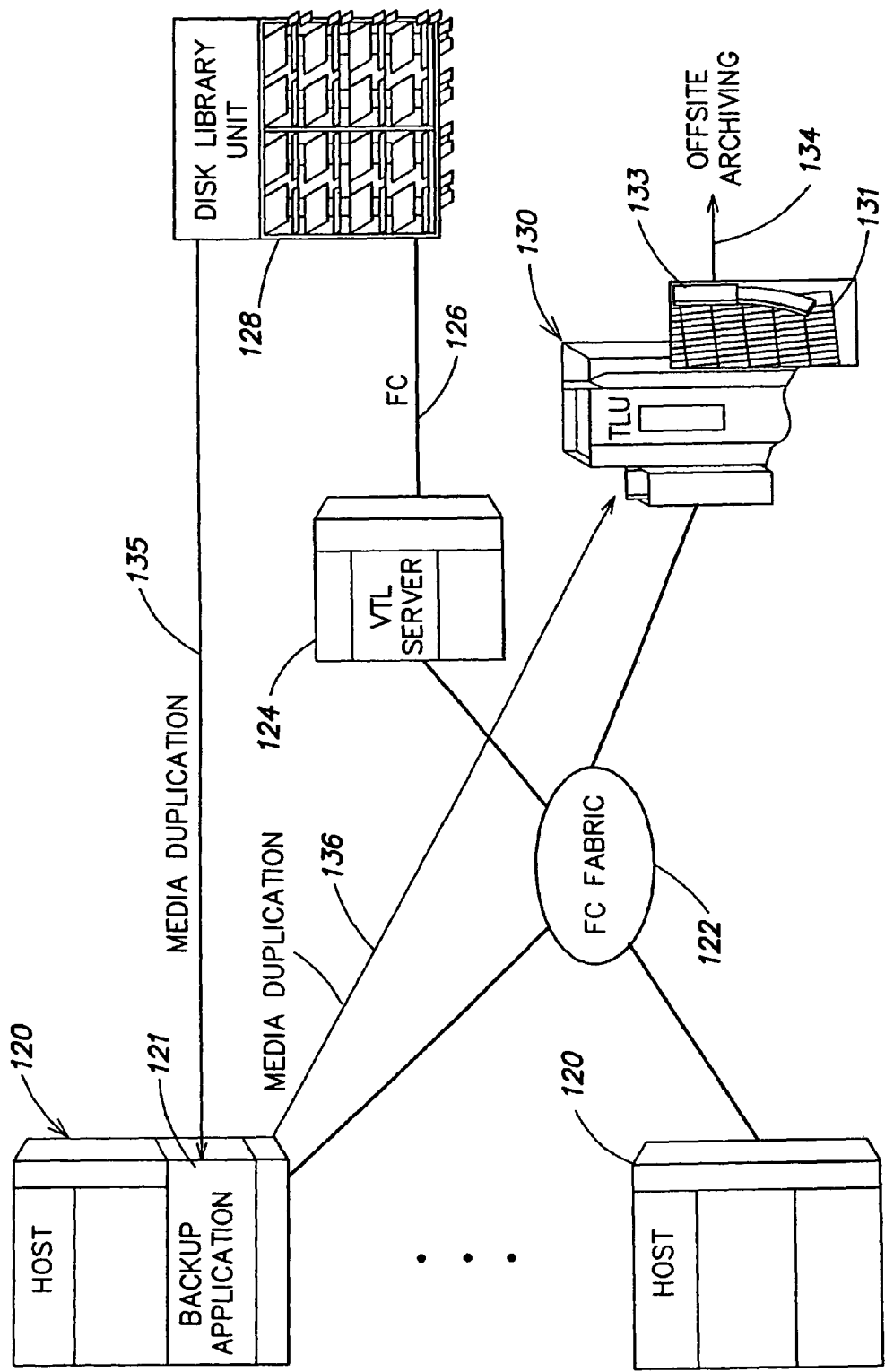
FIG. 7 is a schematic diagram of a network architecture for another implementation, including a local backup data site and an offsite archiving site.
Figure 8:
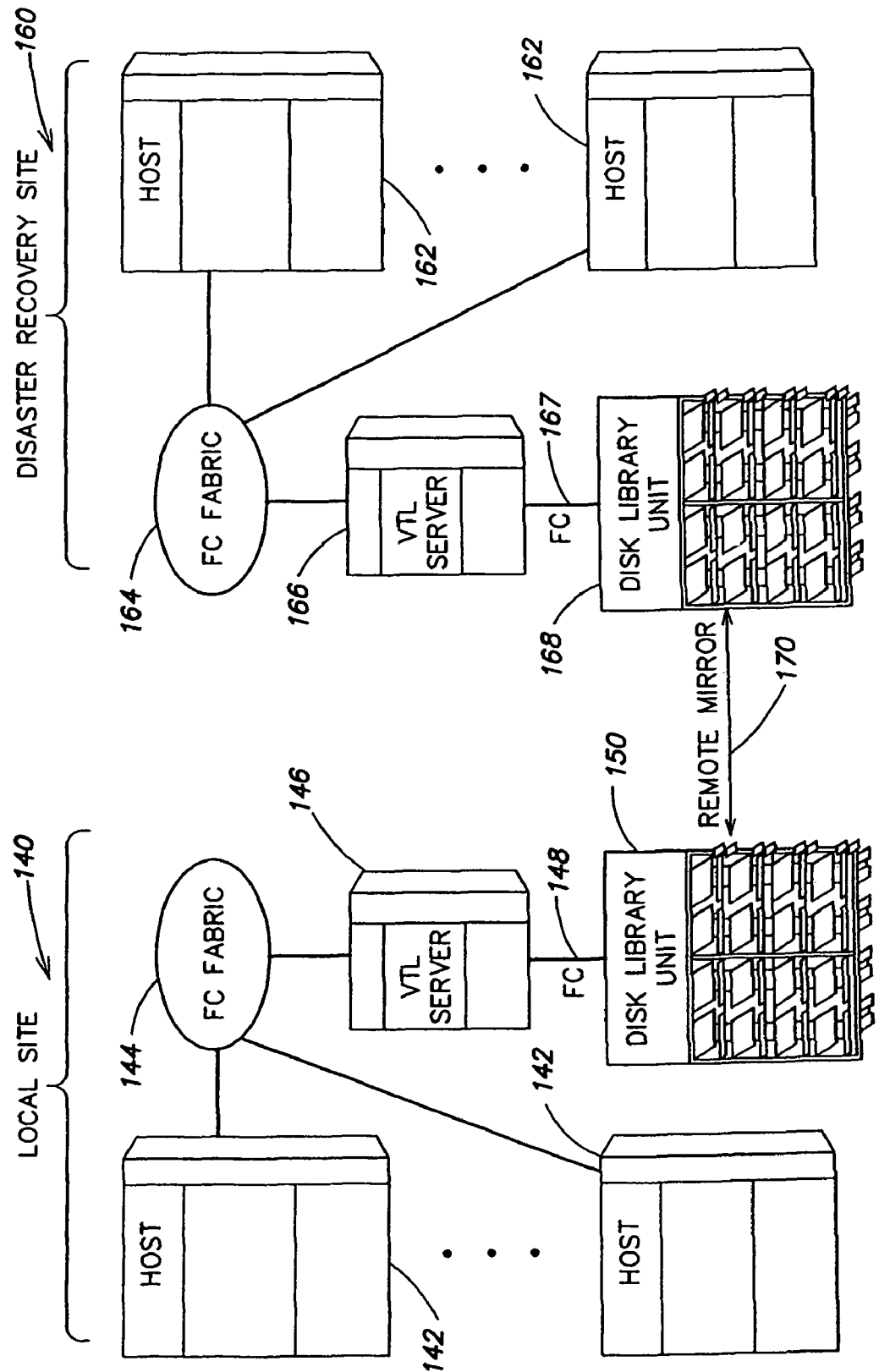
FIG. 8 is a schematic diagram of a network architecture for another implementation, including a local site for storing backup data and a disaster recovery site for remote mirroring.

Other implementations are illustrated in FIGS. 7 and 8. In both of these implementations, a local site includes a VTL server 124, 146, respectively, and a disk library unit (DLU) 128, 150, respectively, which serve as a primary (although virtual) library for active backup data. In both cases, a plurality of hosts 120, 142 are connected by a FC fabric 122, 144 to the VTL servers 124, 146 (respectively), and the VTL servers 124, 146 are connected via a FC 126, 148 to the DLUs 128, 150 (respectively). Where they differ is that in FIG. 7, a physical tape library unit (TLU) 130 is also connected via FC fabric 122 and functions as a data import/export device to allow off-site archiving of data (see arrow 134). A backup application 121 in host 120 initiates and controls media duplication (see arrows 135, 136) of data stored in the DLU 128 (the virtual storage pool) which is then sent to the TLU 130 for archiving. The individual tape cartridges 131 in the TLU can then be physically removed (by robotics arm 133) and transported to an off-site location for off-site archiving (arrow 134). Duplication is a common feature in open systems backup applications, such as Veritas™ NetBackup, Legato™ NetWorker, etc.

In FIG. 8, a local site 140 includes VTL server 146 and DLU 150 as the primary (virtual) library for active backup data. At a remote disaster recovery site 160, there is provided another VTL server 166 connected by FC fabric 164 to a plurality of hosts 162, and by FC link 167 to DLU 168. Remote mirroring between the local and remote DLUs 168 and 150 (see arrow 170) is used to recover data from the disaster recovery site 160 that has been lost at the local site 140.

Figure 9:
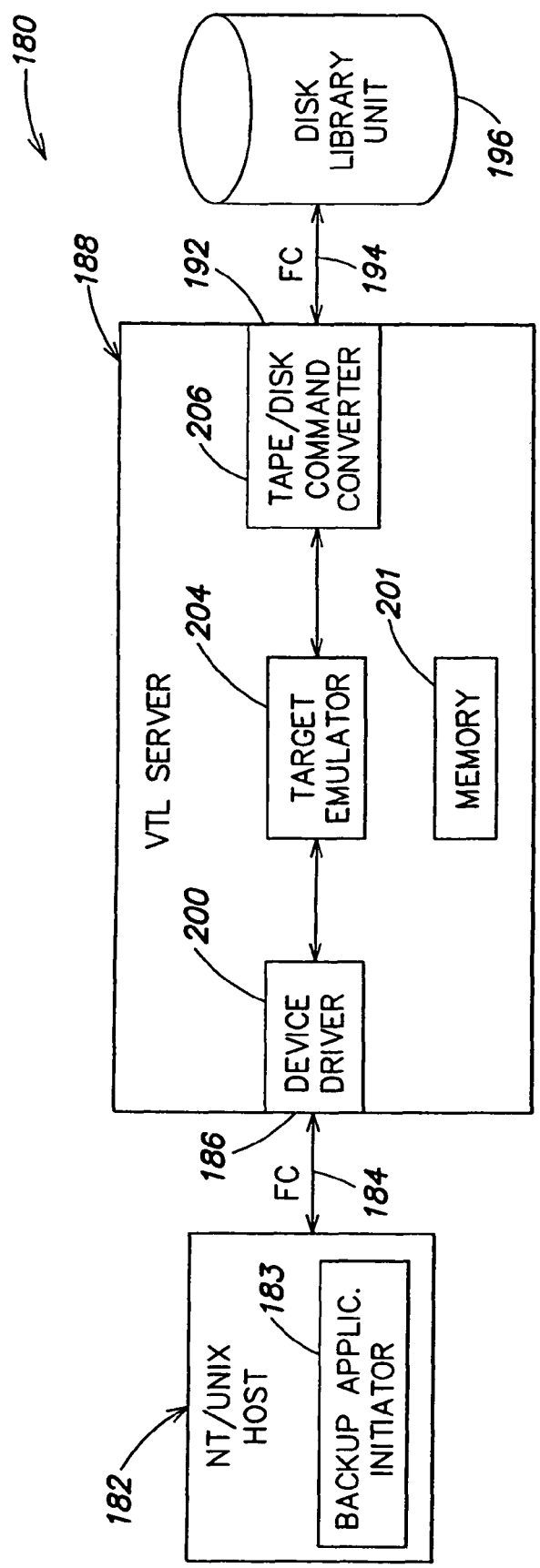
FIG. 9 is a schematic illustration of the hardware components of a VTL server according to an implementation consistent with the invention.
Figure 10:
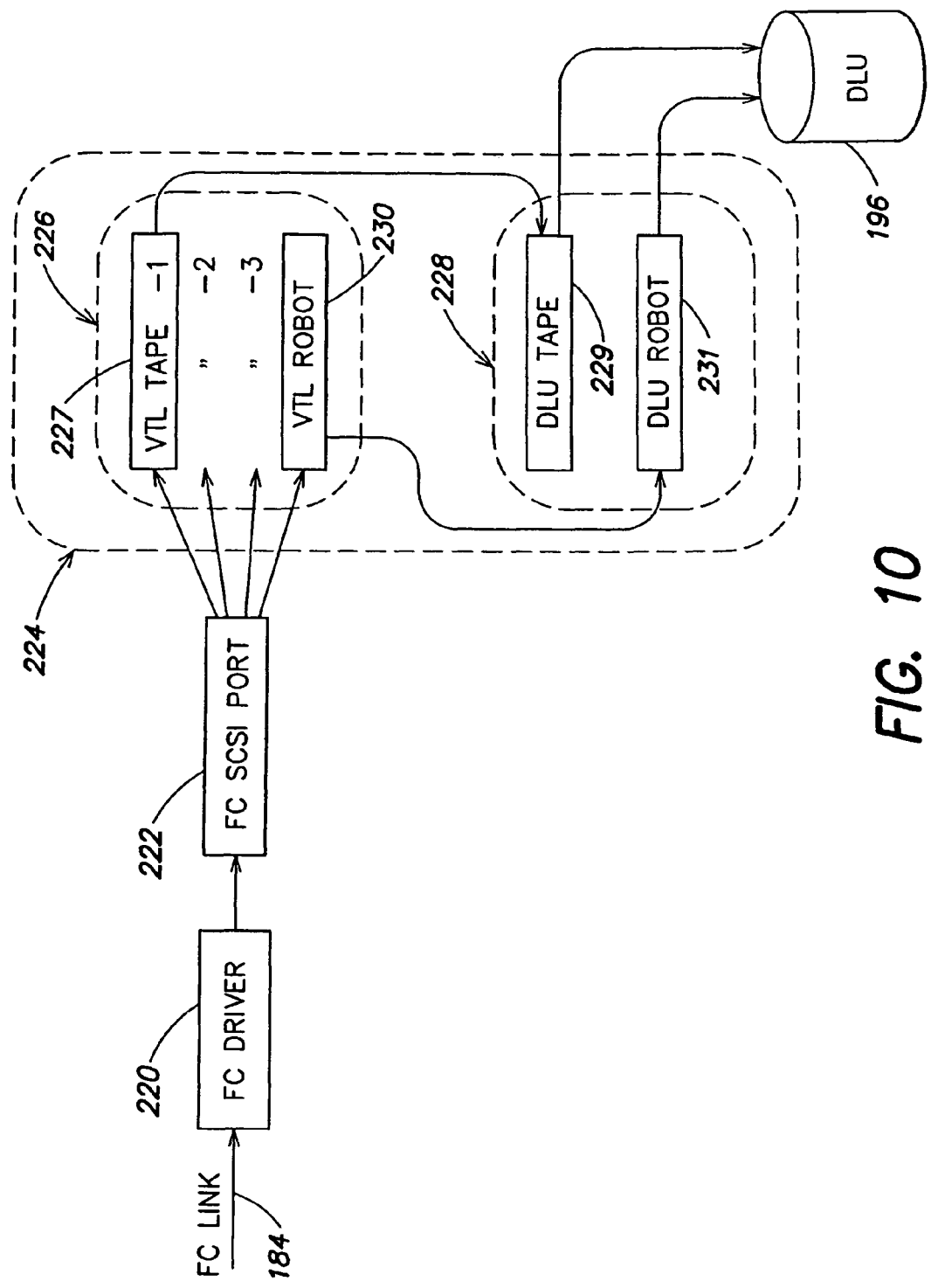
FIG. 10 is a corresponding software block diagram for the VTL server of FIG. 9.

FIGS. 9-10 illustrate a specific implementation of a VTL server acting as a disk-based tape emulation system 180 in an open systems environment, consistent with the invention. FIG. 9 is a schematic illustration of the hardware components, while FIG. 10 is a schematic illustration of the software components.

As shown in FIG. 9, an NT (or Unix) host 182 is connected via Fibre Channel 184 to a front end 186 of a VTL server 188. A back end 192 of VTL server 188 is connected by a Fibre Channel 194 to a Disk Library Unit 196. Host 182 includes a backup application 183 which acts as an "initiator" in issuing a command to a "target" tape storage device. This implementation utilizes the Fibre Channel Protocol (FCP) for SCSI, second version (hereinafter FCP-2), a draft proposed by the American National Standards Technical Committee T10, Project 1144D, Revision 8, Sep. 23, 2002 (available at www.t10.org). This standard describes a frame format and protocol for transferring commands and data between a SCSI (Small Computer System Interface) initiator and target using the FC (Fibre Channel) transmission standards. Before discussing further the implementation of FIGS. 9-10, a short summary of the SCSI and FC standards is provided.

The Small Computer System Interface (SCSI) command set is widely used today for a variety of device types. The transmission of SCSI commands across Fibre Channel links allows the large body of SCSI application and driver software to be used in the Fibre Channel (FC) environment.

FCP-2 is part of the SCSI family of standards developed by T10 to facilitate the use of SCSI command sets for many different types of devices across many different types of physical interconnects. The architectural model for the family of standards is set forth in NCITS Project 11570, Information Technology—SCSI Architecture Model-2 (SAM 2).

Fibre Channel (FC) is implemented as a high-speed serial architecture that allows either optical or electrical connections at data rates from 265 Mbits up to 4 Gbits per second. Topologies supported by Fibre Channeling include point-to-point, fabric switched, and arbitrated loop. All FC connections use the same standard frame format and standard hierarchy of transmission units to transmit Information Units (IUs) that carry SCSI information.

Fibre Channel (FC) is logically a point-to-point serial data channel. The architecture may be implemented with high-performance hardware that requires little real-time software management. The FC protocol utilizes the multiplexing and shared bandwidth capabilities provided by various FC classes of service and provides options for reliable error detection and error recovery independent of the class of service.

FCP-2 defines a Fibre Channel mapping layer (FC-4) that uses the services defined by NCITS Project 1311D, "Fibre Channel Framing And Signaling Interface (FC-FS)", to transmit SCSI command, data, and status information between a SCSI initiator and a SCSI target. The following definitions from FCP-2 are relevant:

3.1.6 application client: An object that is the source of SCSI commands.

3.1.9 command: A request describing a unit of work to be performed by a device server.

3.1.12 data in delivery service: A confirmed service used by the device server to request the transfer of data to the application client.

3.1.13 data out delivery service: A confirmed service used by the device server to request the transfer of data from the application client.

3.1.16 device server: An object within the logical unit that executes SCSI tasks and enforces the rules for task management.

3.1.20 FCP Exchange: A SCSI I/O Operation for the Fibre Channel FC-2 layer. The SCSI I/O Operation for Fibre Channel is contained in a Fibre Channel Exchange.

3.1.21 FCP I/O operation: A SCSI I/O Operation for the Fibre Channel FC-4 layer, as defined in FCP-2.

3.1.22 FCP_Port: An N_Port or NL_Port that supports the SCSI Fibre Channel Protocol.

3.1.27 Information Unit: An organized collection of data specified by the Fibre Channel protocol to be transferred as a single Sequence by the Fibre Channel service interface.

3.1.28 initiator: A SCSI device containing application clients that originate device service requests and task management functions to be processed by a target SCSI device. In this standard, the word "initiator" also refers to an FCP_Port using the Fibre Channel protocol to perform the SCSI initiator functions defined by SAM-2

3.1.31 logical unit: A target resident entity that implements a device model and processes SCSI commands sent by an application client.

3.1.32 logical unit number: An encoded 64-bit identifier for a logical unit.

3.1.54 SCSI device: A device that originates or services SCSI commands.

3.1.55 SCSI I/O operation: An operation defined by a SCSI command, a series of linked SCSI commands or a task management function.

3.1.58 target: A SCSI device that receives SCSI commands and directs such commands to one or more logical units for execution. In this standard, the word "target" also refers to an FCP_Port using the Fibre Channel protocol to perform the SCSI target functions defined by SAM-2.

3.1.60 task: An object within the logical unit representing the work associated with a command or group of linked commands.

The Fibre Channel physical layer (FC-2 layer) described by FC-FS performs those functions required to transfer data from one port to another (referred to as FCP_Ports). A switching fabric allows communication among more than two FCP_Ports. An arbitrated loop (FC-AL) is an alternative multiple port topology that allows communication between two ports on the loop, or between a port on the loop and a port on a switching fabric attached to the loop.

The FCP device and task management protocols define the mapping of SCSI functions, defined in SCSI Architecture Model-2 (SAM-2), to the Fibre Channel interface defined by FC-FS. The I/O operation defined by SAM-2 is mapped into a Fibre Channel exchange. A Fibre Channel exchange carrying information for a SCSI I/O operation is an FCP exchange. The request and response primitives of an I/O operation are mapped into Information Units (IUs) as shown in Table 1.

TABLE 1

SCSI and Fibre Channel protocol functions

| SCSI function | FCP equivalent |
| --- | --- |
| I/O operation | Exchange |
| Protocol Service Request and Response | Sequence |
| Send SCSI Command Request | Unsolicited command IU (FCP_CMND) |
| Data delivery request | Data descriptor IU (FCP_XFER_RDY) |
| Data delivery action | Solicited data IU (FCP_DATA) |
| Send Command Complete Response | Command status IU (FCP_RSP) |
| REQ/ACK for Command Complete | Confirmation IU (FCP_CONF) |

An application client begins an FCP I/O operation by invoking an Execute Command remote procedure call (see SAM-2). The Execute Command call conveys a single request or a list of linked requests from the application client to the FCP service delivery subsystem. Each request contains all the information necessary for the execution of one SCSI command, including the local storage address and characteristics of data to be transferred by the command. The FCP then performs the following actions using FC-FS services to perform the SCSI command.

The FCP_Port that is the initiator for the command starts an Exchange by sending an unsolicited command IU containing the FCP_CMND IU payload, including some command controls, addressing information, and the SCSI command descriptor block (CDB).

When the device server for the command has completed the interpretation of the command, has determined that a write data transfer is required, and is prepared to request the data delivery service, it sends a data descriptor IU containing the FCP_XFER_RDY IU payload to the initiator to indicate which portion of the data is to be transferred. The FCP_Port that is the initiator then transmits a solicited data IU to the target containing the FCP_DATA IU payload requested by the FCP_XFER_RDY IU. The data delivery request and returning payloads continue until the data transfer requested by the SCSI command is complete.

Alternatively, when the device server for the command has completed the interpretation of the command and has determined that a read data transfer is required, the FCP_Port that is the target transmits a solicited data IU to the initiator containing the FCP_DATA IU payload. Data deliveries containing payloads continue until all data described by the SCSI command is transferred.

After all the data has been transferred, the device server transmits the Send Command Complete protocol service response (see SAM-2) by requesting the transmission of an IU containing the FCP_RSP IU payload. That payload contains the SCSI status and, if the SCSI status is CHECK CONDITION, the autosense data describing the condition. The FCP_RSP IU indicates completion of the SCSI command. If no command linking, error recovery or confirmed completion is requested, the FCP_RSP IU is the final sequence of the Exchange. Other details of the protocol are available at www.t10.org.

Referring back again to FIG. 9, at the front end 186 of VTL server 188 there is a device driver 200 which acts as a SCSI target and accepts the host (initiator) request (command). Thus, driver 200 receives Fibre Channel frames containing an SCSI over FC (FCP) command (the FCP_CMND Information set). Driver 200 stores the frames in memory 201 in VTL server 188. Then driver 200 forwards the frames (containing the FCP command) to a target emulator 204.

The target emulator 204 receives the host request (command) and identifies itself as either a tape drive (SCSI stream device) or a tape library unit robotics (SCSI medium changer). The target emulator software understands the content of and processes FCP commands. For this purpose, it needs to understand four fields in the FCP command, namely:

Opcode

Logical Unit Number (LUN)

Read/Write (here in the target emulator read and write mean "data in delivery service" or "data out delivery service")

Command/Task Management

In this context a SCSI command is addressed to a specific LUN (e.g., a specific tape device—tape drive or TLU robotics). The target (e.g., a TLU) may be the front end for a plurality of LUNs. In contrast, a SCSI task management command is intended for the entire target. The target emulator 204 checks to see if the tape device identified by the LUN in the command, exists. The target emulator 204 also checks the command's write field, and if flagged, checks whether a buffer is available to hold data. If it is, the emulator 204 sends a transfer ready signal back to the host. It adds FCP details to the response, without specifying what type of storage is attached.

More specifically, emulator 204, being aware of the format of the FCP_CMND information set, can access the memory 201 in which the command is stored and proceed to analyze it:

It checks the "SCSI CDB opcode" and verifies that it is a valid opcode.

It checks the LUN (which identifies a specific virtual tape drive device or a virtual tape library robotics) and verifies that it exists.

If the opcode is illegal, or there is no virtual device (tape drive or robotics) associated with the LUN, emulator 204 rejects the command by sending back (through driver 200) a response to the host 182 with an appropriate error code (this response is called FCP_RSP).

If the opcode is legal, and there is a virtual device associated with the command:

If the command is a "data-out" command, meaning the hosts are sending (writing) data to the VTL server, emulator 204 starts the data transfer (i.e., notifies host 182 that VTL server 188 is ready and the host can start sending the data to the VTL server). The data is transferred to a specific buffer in memory 201 of the VTL server (there are two buffers assigned to each VTL virtual tape drive for this purpose).

If it is not a "data-out" command, or if it is a "data-out" command and all of the data has already been transferred to the VTL, emulator 204 (through a queue) forwards the FCP_CMD (and the buffer containing the data, if it was a "data-out" command) to tape/disk command converter 206.

Thus, the command is next sent to converter 206 which converts the tape command to a disk command and creates a disk storage model. The converter software knows how to store the data to disk, how to catalog what data is written where, and how to manage the disk.

Converter 206 will check the SCSI CDB opcode and execute the specific action/operation required by the opcode. Converter 206 executes the action/operation either on its own, or by calling a function of the DLU 196. The DLU 196 is responsible for storing data to the disks and managing the status of the virtual tape library. Each emulated tape drive and tape robotics will correspond with a different LUN. Thus, the LUN in the address field of the FCP_CMD can be either for a stream device (tape drive) or a medium changer (tape robotics). Converter 206 knows how to send commands to the disk in either tape device or robotics formats.

Once the required action/operation is complete, converter 206 sends a response via emulator 204 to the host 182 indicating the completion status (FCP_RSP).

FIG. 10 is the corresponding schematic software block diagram for VTL server 188 of FIG. 9. A first block, connected to input FC link 184, is an FC driver block 220 which corresponds to device driver 200 in FIG. 9. A second block is a FC-SCSI port block 222, which provides the functionality of target emulator 204. A third block provides an emulated SCSI tape storage device 224. Block 224 may include several instances (one instance 226 per virtual tape drive or virtual robot) of VTL tape and robot objects, each having a different LUN, and comprises the tape storage model; it further includes a set 228 of associated DLU tape and robot objects, comprising the disk storage model. Each VTL tape object 227 has a corresponding DLU tape object 229 in the disk storage model 228. Similarly, each VTL robot object 230 has a corresponding DLU robot object 231 in the disk storage model. The objects in the disk storage model 228 correspond to data which is then stored in the disk library unit 196. DLU 196 holds both the data received from host 182, and the data describing the emulated tape device (see e.g., FIG. 11). The latter may comprise a database, such as relational table, stored in the DLU. A more detailed description of one particular DLU system architecture follows.

Figure 11:
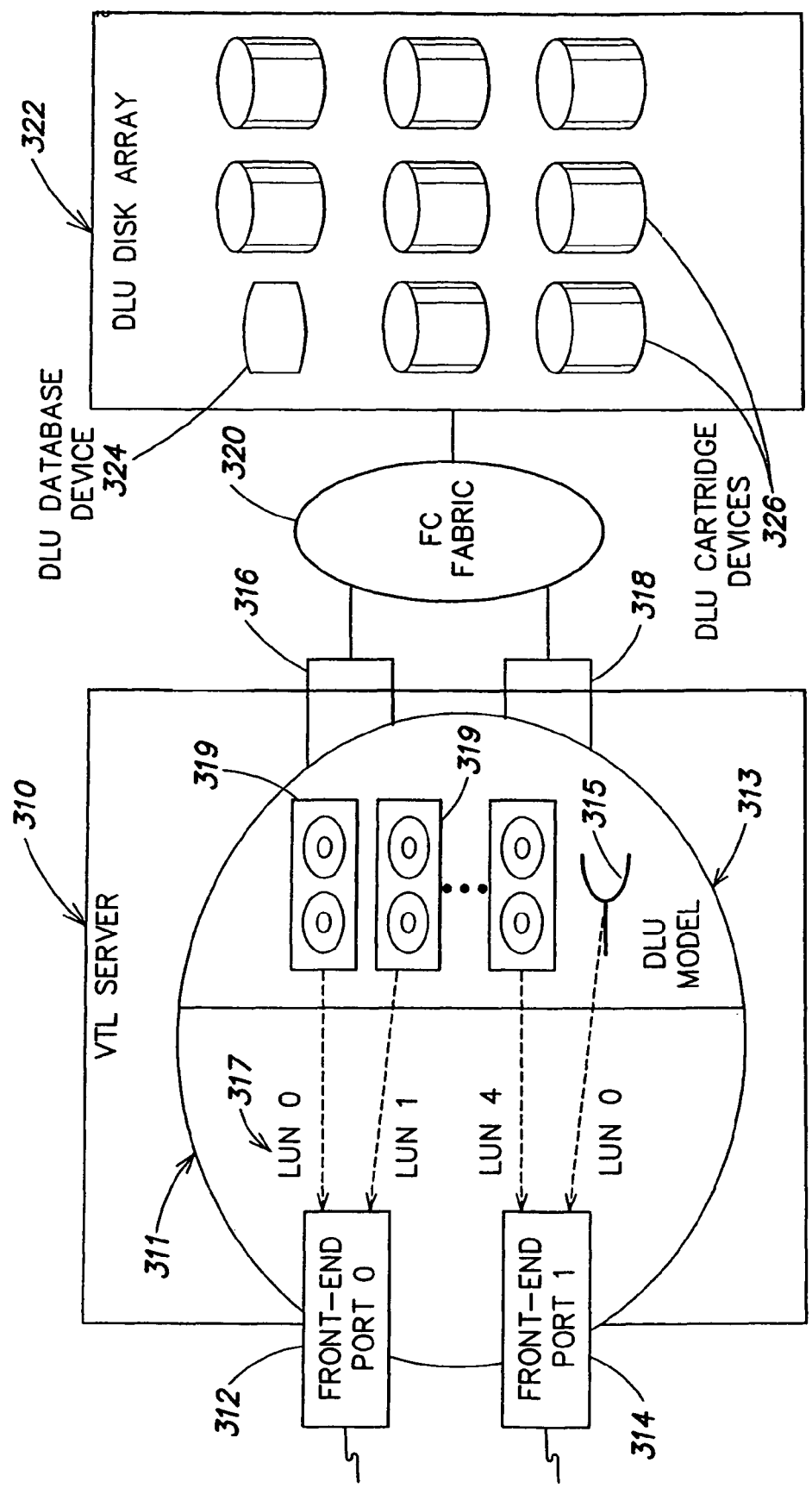
FIG. 11 is a schematic illustration of a DLU system architecture for an implementation consistent with the invention.

A more specific implementation of a DLU system architecture for emulating a tape library unit (TLU) is shown in FIG. 11. This figure also illustrates the correlation of LUN identifiers 317 with VTL devices (tape drives 319 and TLU robotics 315).

A VTL 310 server (shown schematically) has two front-end ports, front-end port 0 (312) and front-end port 1 (314). VTL server 310 has two back-end ports 316, 318 connected by FC fabric 320 to DLU disk array 322. Disk array 322 includes a DLU database device 324 and multiple DLU cartridge devices 326.

VTL server 310 has residing thereon VTL software 311 with a DLU model 313 of the emulated tape devices—virtual tape drives 319 and virtual TLU robotics 315. DLU model 313 manages the DLU disk array persistent storage, which includes:

DLU cartridges; and

DLU robotics, bins, import/export slots, and tape drives.

DLU 322 emulates the TLU robotics and a configurable number of tape drive devices; the DLU virtual tape drives provide "sequential access" to random access devices (DLU cartridge devices 326).

DLU database device 324 contains configuration information for all elements in the virtual tape library emulated by the DLU. It further contains the status of all such elements in the virtual tape library, namely:

robot;

bins (slots that hold the virtual cartridges);

tape drives;

import/export slots; and shared boxes, which allow two or more VTL servers to be attached to the same DLU disk array.

The information in DLU database device 324 is updated each time there is a command that changes the status of one or more elements in the virtual tape library. For example, an SCSI Move command sent to the DLU robot (315 in DLU model 313) asks the robot to move a cartridge from a bin to a tape drive (319 in DLU model 313); this changes the status of the respective bin and the status of the respective tape drive, which status changes will be made in the DLU database device 324.

Figure 12:
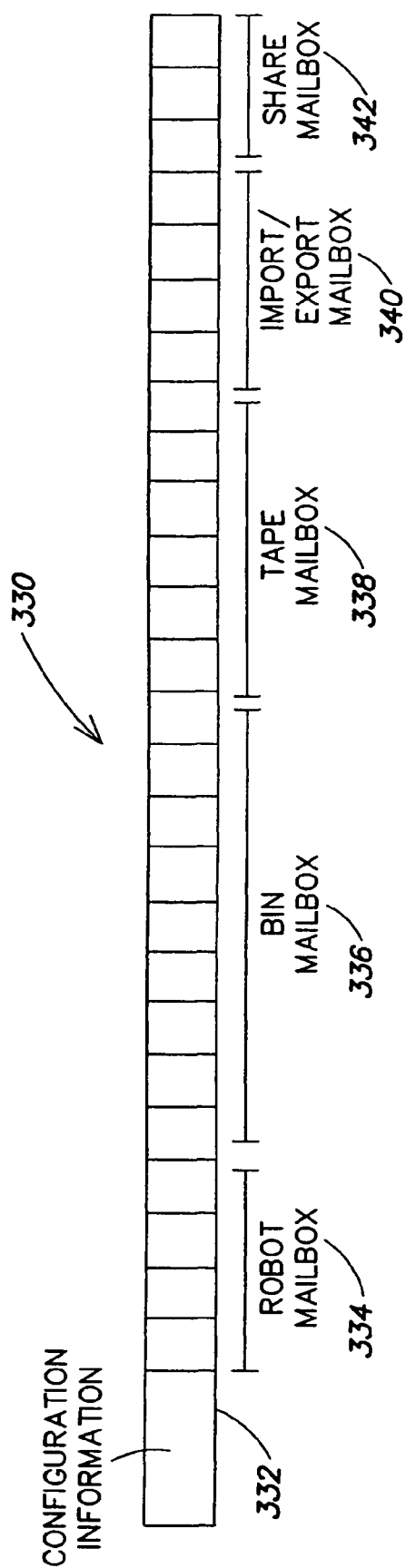
FIG. 12 is an example of a DLU database device data structure according to one implementation consistent with the invention.

DLU database device 324 of this example has a data structure 330 illustrated in FIG. 12, with the following fields:

configuration information 332, which includes: number of robots; number of bins; number of tape drives; number of import/export slots; number of shared boxes; virtual cartridges information;

robot mailbox 334, which contains the information and status of the robot; there is one entry for each configured robot (normally, there is only one configured robot);

bin mailbox 336, which contains the information and status of the bin; for example, the bin may be full or empty; if full, the label of the virtual cartridge that occupies the bin is provided; there are as many entries as there are configured bins;

tape mailbox 338, contains the information and status of the tape drive; for example, the tape drive may be full or empty; if full, the label of the virtual cartridge that occupies the tape drive is provided; there are as many entries as configured tape drives;

import/export mailbox 340, which contains the information and status of the import/export slot; there are as many entries as configured slots;

share mailbox 342, which contains the information of the VTL server connected to the DLU disk array; there is one entry for each VTL server attached to the DLU disk array.

DLU disk array 322 (see FIG. 11) includes one or more DLU virtual cartridges 326. Each virtual cartridge contains:
some configuration information, such as the virtual cartridge label, the virtual cartridge barcode, etc.;
the data written by the user;
the cartridge directory that describes the data that has been written to the cartridge and the current position of the cartridge.

Figure 13:
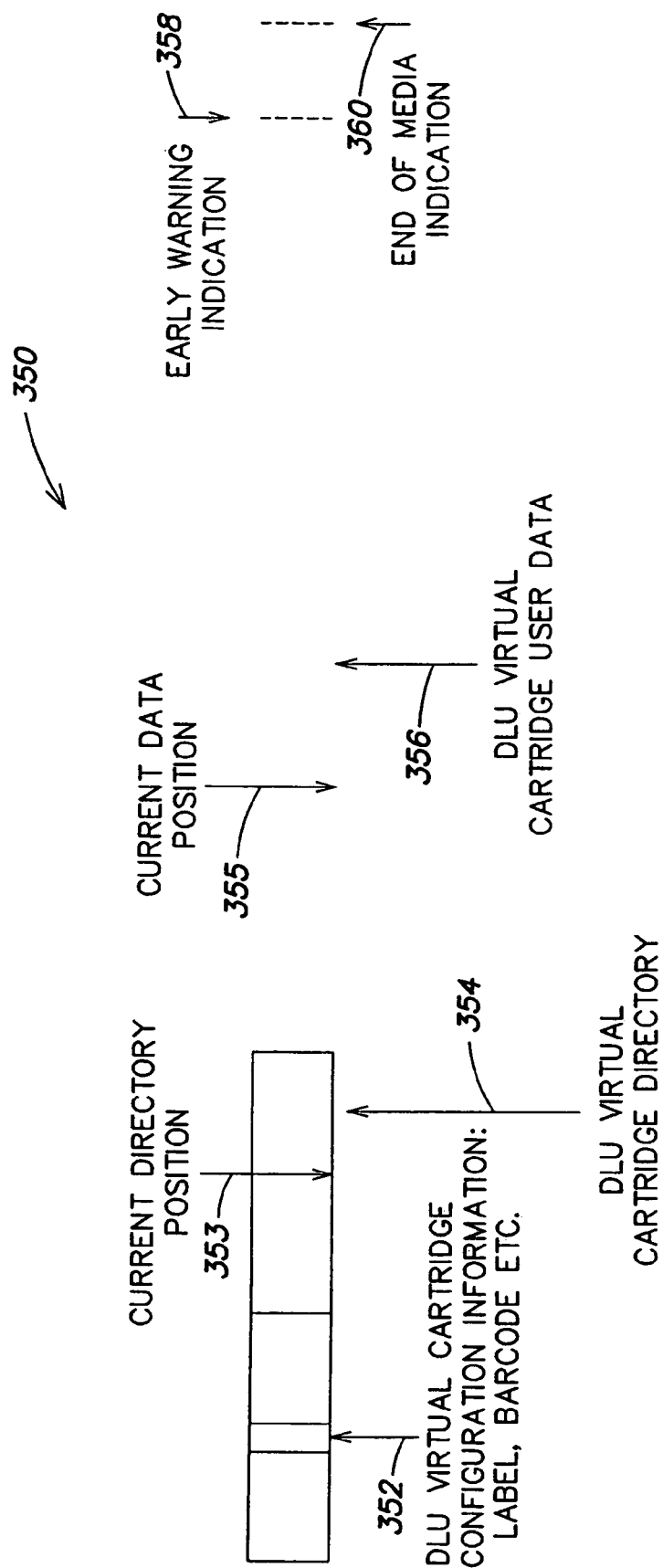
FIG. 13 is an example of a DLU cartridge device database structure according to one implementation consistent with the invention.

DLU cartridge device 326 (see FIG. 11) of this example has a data structure 350 illustrated in FIG. 13, with the following fields:
DLU virtual cartridge 352, which contains configuration information such as the label, barcode, etc.;
DLU virtual cartridge directory 354;
DLU virtual cartridge user data 356;
early warning indication 358;
end of media indication 360.

The current directory position 353 in field 354 and the current data position 355 in field 356 record the current status of the cartridge and provide a sequential access method to the DLU cartridge device 326.

For example, a 32K SCSI Write command may be implemented as follows:
the DLU will add an entry to the cartridge directory 354 in the position pointed to by the "current directory position" 353. This entry will state the size of the IO (e.g., 32K);
the "current directory position" 353 will be moved forward by one entry;
the DLU will write the 32K data sent in the Write command to the position pointed to by the "current data position" 355;
the "current data position" 355 will be moved forward by 32K;
if the "early warning indication" 358 or the "end of media indication" 360 are reached while writing the data, the respective indication is sent back in the response to the write command (in the FCP_RSP).

As another example, a SCSI Space command ("space backwards one block"), may be implemented as follows:
the "current directory position" 353 is moved back one entry;
the content of the entry pointed to by the "current directory position" 353 is read (e.g., 32K);
the "current data position" 353 is moved back according to the value read in the directory entry (32K).

FIG. 11 also illustrates the assignment of one VTL front-end FC port (312, 314) to one or more VTL devices (VTL tape 319 and/or VTL robot 315). It further illustrates "visible LUNs" 317 associated with each VTL device (e.g., LUN0 and LUN1 associated with port 0, and LUN4 and LUN1 associated with port1).

Front-end ports 312, 314 and visible LUNs 317 are defined in a VTL configuration file: vtl.cfg. Almost all SCSI commands are addressed to a specific LUN. Commands that are not addressed to a specific LUN are handled by the front-end port itself ("target collector"); an example is a report LUN. SCSI commands can be classified as: data-in commands (e.g., read); data-out commands (e.g., write); and no data commands (e.g., rewind).

Figure 14:
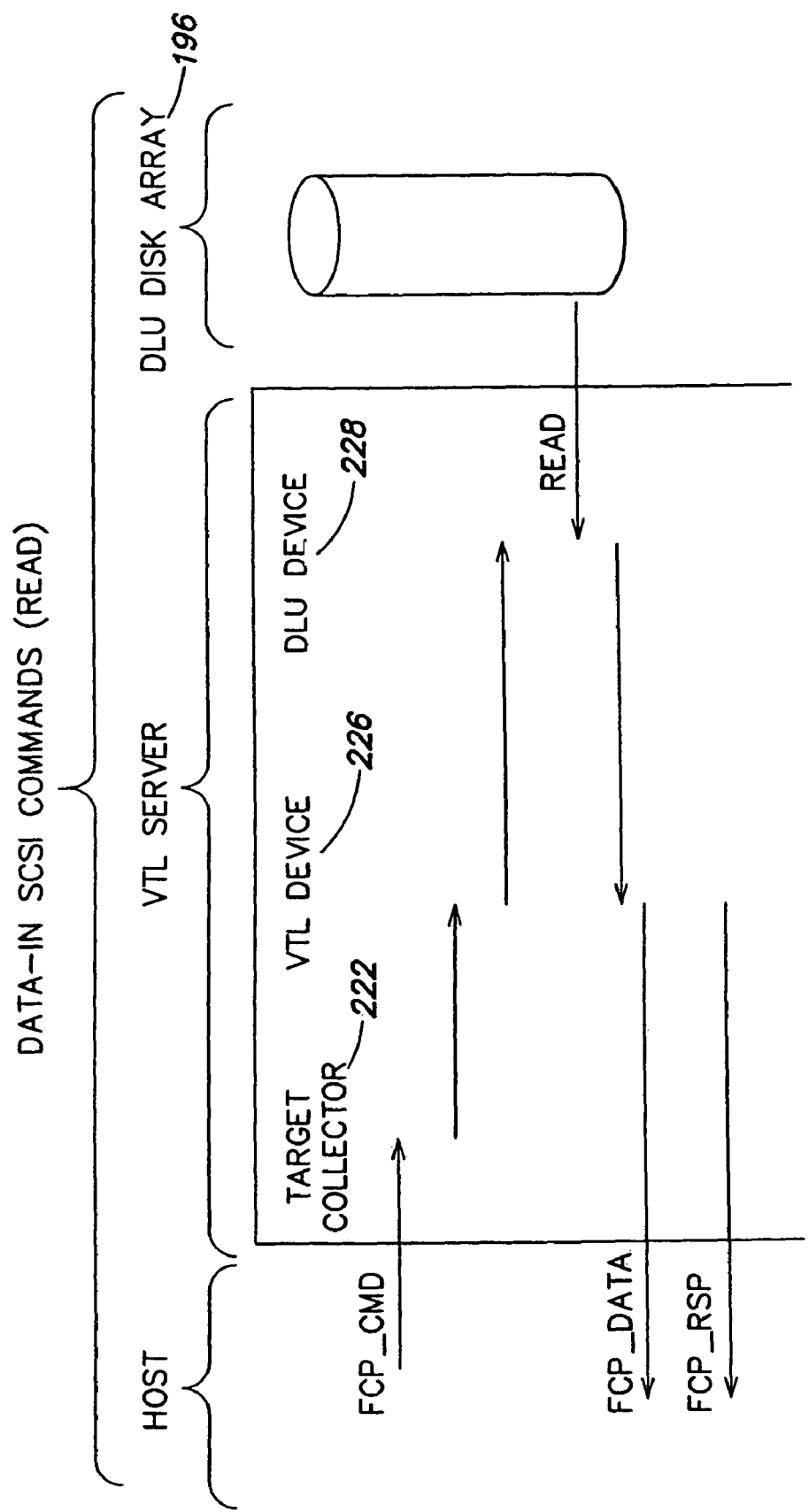
FIG. 14 illustrates a command sequence for a SCSI read command.

FIG. 14 illustrates a timing sequence for forwarding and execution of a SCSI data-in command for the read operation. The host sends a FCP_CMD command to the target collector (222 in FIG. 10); it is forwarded to the VTL device (226 in FIG. 10), and then to the DLU device (228 in FIG. 10). DLU device 228 executes the command, by reading data from the physical DLU disk array (196 in FIG. 10). The read data is transmitted back to VTL device 226, and is included in a FCP_DATA response generated by VTL device 226 and forwarded via target collector 222 back to the host. VTL device 226 also generates a FCP_RSP response which is sent back to the host.

Figure 15:
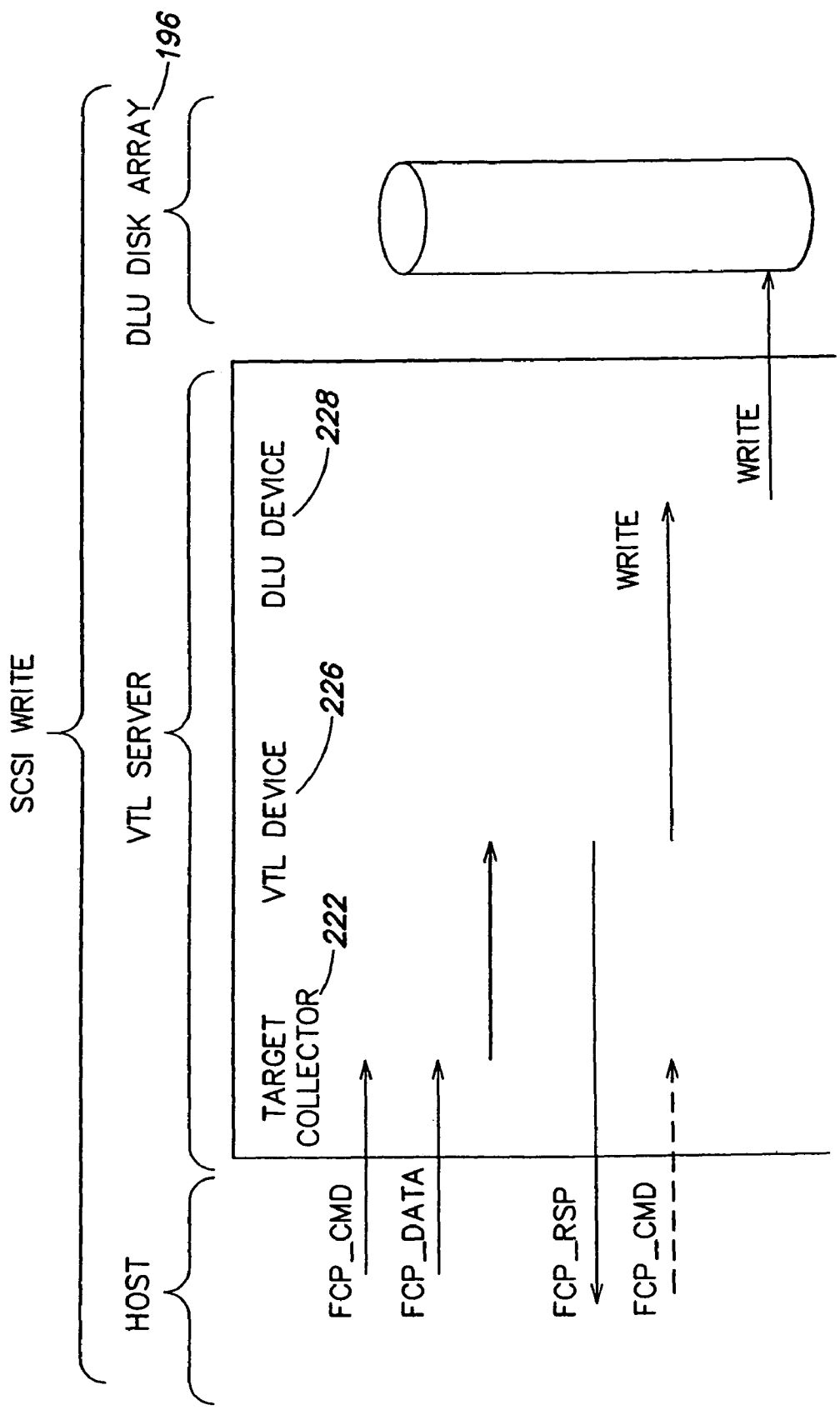
FIG. 15 illustrates a command sequence for a SCSI write command.

FIG. 15 illustrates a timing sequence for a SCSI write command. The host issues a FCP_CMD (a SCSI write) command, followed by FCP_DATA (the data transfer), which are sent to target collector 222 of the VTL server. The target collector forwards the data to VTL device 226, which in reply sends a FCP_RSP response back to the host. VTL device 226 forwards the data to DLU device 228, which in turn forwards the data to physical DLU disk array 196.

FIG. 15 further illustrates a dual buffer mechanism which enables the VTL software to manage commands on both its front-end (connected to the hosts) and back-end (connected to disk storage) simultaneously. While the back-end is busy writing to the disk, the front-end can process the next write command (see dotted arrow with FCP_CMD command in FIG. 15).

Other implementations consistent with the invention will be apparent to those skilled in the art from consideration of the specification and practice of the implementations disclosed herein. It is intended that the specification and examples be considered as exemplary only, with a true scope of the invention being indicated by the following claims.

The invention claimed is:

1. A method comprising:
in an open systems environment wherein a plurality of backup hosts are connected to a plurality of virtual tape library servers (VTL servers) which in turn are connected to each of a plurality of disk library units (DLUs) thus providing scalable connectivity at both the front ends of the plurality of VTL servers to the plurality of hosts and at the back ends of the plurality of VTL servers to the plurality of DLUs, and wherein data is sent directly from the hosts to the VTL servers without intermediate disk cache or intermediate disk staging areas,
each VTL server being adapted to receive tape storage commands, and
in response to receiving a tape storage command, the respective VTL server:
accepting the tape storage command and responding as if the VTL server were the respective target tape storage device; and
emulating the respective target tape storage device by converting the received tape storage command to at least one disk storage command for implementing the received tape storage command with one or more disk storage devices,
wherein the step of emulating includes providing a model describing a tape library including tape drive devices, including the emulated target tape storage device, whereby the VTL server emulates the tape drive devices,
wherein data simultaneously streaming from the plurality of backup hosts is received by multiple of the servers, where the multiple VTL servers receiving the simultaneously streamed data write to the same DLU.

2. The method of claim 1, wherein:
configuration and status information for one or more virtual tape storage devices corresponding to one or more target tape storage devices emulated by the target emulator is stored; and wherein the configuration and status information are updated as a function of the received tape storage commands, wherein multiple different types of tape storage devices are emulated, wherein a backup application on a backup host stores status information of the target tape storage devices to which the backup application has directed tape storage commands, and said status information stored in the backup application corresponds to the status information stored in the respective VTL server.

3. The method of claim 1, wherein the model includes tape objects and robot objects, wherein the tape storage commands further include commands in robotics format.

4. The method of claim 1, wherein emulation data is stored describing the emulated target tape storage devices.

5. The method of claim 4, wherein the emulation data has a data structure including one or more of the following fields: configuration information, cartridge directory, and cartridge data.

6. The method of claim 4, wherein the emulation data has a data structure including one or more of the following fields: configuration information, robot mailbox, bin mailbox, tape mailbox, import/export mailbox, share mailbox, cartridge directory, and cartridge data.

7. The method of claim 1, wherein:

data from the one or more hosts can be simultaneously streamed to the plurality of VTL servers and onto a plurality of disk storage devices.

8. The method of claim 1, wherein:

at least some of the backup hosts have different operating systems and/or backup applications running thereon, wherein one of the VTL servers simultaneously communicates with a plurality of the backup hosts having different operating systems and/or different backup applications running thereon.

9. The method of claim 1, wherein:

each VTL server has residing thereon VTL software with a DLU model of the emulated tape devices, and the DLU model manages a DLU database maintained on persistent storage.

10. A computer-implemented virtual tape storage system comprising:

an open systems environment wherein a plurality of virtual tape library servers (VTL servers) are capable of receiving data from a plurality of backup hosts, the VTL servers being connected to each of a plurality of disk library units (DLUs) thus providing scalable connectivity at both the front ends of the plurality of VTL servers to the plurality of hosts and at the back ends of the plurality of VTL servers to the plurality of DLUs, and wherein data is sent directly from the hosts to the VTL servers without intermediate disk cache or intermediate disk staging areas, wherein each VTL server comprises:

a front end connectable to one or more heterogeneous hosts in an open systems environment and configured to accept tape storage commands from the one or more hosts, a target emulator, coupled to the front end, to receive the tape storage command and emulate, as a corresponding virtual tape storage device, the target tape storage device identified in the tape storage command;

a command converter, coupled to the target emulator, to receive the tape storage command and convert the tape storage command into one or more disk storage device commands as a function of the virtual tape storage device;

a back end, coupled to the command converter, to receive the one or more disk storage device commands and to forward the disk storage device commands to one or more disk storage devices coupled thereto, the virtual tape storage system further comprising a model describing a tape library including tape drive devices including the emulated target tape storage device, whereby the emulation of the target tape storage device comprises emulating the tape drive devices, wherein all of the VTL servers are coupled to the same plurality of DLUs and are able to write directly to the same plurality of DLUs.

11. The system of claim 10, wherein the one or more disk storage devices comprise one or more of a disk drive and a disk array, wherein data simultaneously streaming from the plurality of backup hosts is received by multiple of the VTL servers, where the multiple VTL servers receiving the simultaneously streamed data write to the same DLU.

12. The system of claim 10, wherein at least one of the hosts has a backup application which issues the tape storage commands and serves as a single point of management and control for backup operations.

13. The system of claim 10, wherein:

configuration and status information for one or more virtual tape storage devices corresponding to one or more target tape storage devices emulated by the target emulator is stored; and wherein the configuration and status information are updated as a function of the received tape storage commands, wherein a backup application on a backup host stores status information of the target tape storage devices to which the backup application has directed tape storage commands, and said status information stored in the backup application corresponds to the status information stored in the respective VTL server.

14. The system of claim 10, wherein the model includes tape objects and robot objects, wherein the tape storage commands further include commands in robotics format.

15. The system of claim 10, wherein the tape storage commands are Small Computer System Interface (SCSI) commands.

16. The system of claim 15, wherein the SCSI commands are adapted for Fibre Channel (FC) transmission.

17. The system of claim 10, wherein the target emulator identifies itself as either a SCSI stream device or a SCSI medium changer.

18. The system of claim 17, wherein the tape storage commands comprise SCSI tape storage commands addressed to tape storage devices with logical unit numbers (LUNs).

19. The system of claim 10, wherein each VTL server provides the target emulator and command converter, and wherein the disk library units comprising said one or more disk storage devices are coupled to the VTL servers to receive the one or more disk storage commands.

20. The system of claim 10, wherein emulation data is stored describing the emulated target tape storage devices.

21. The system of claim 20, wherein the emulation data has a data structure including one or more of the following fields: configuration information, robot mailbox, bin mailbox, tape mailbox, import/export mailbox, share mailbox, cartridge directory, and cartridge data.

22. The method of claim 10, wherein:

at least some of the backup hosts have different operating systems and/or backup applications running thereon, wherein one of the VTL servers receives data simultaneously from at least some of the backup hosts having different operating systems and/or different backup applications running thereon.

23. A computer-readable medium containing computer-readable instructions enabling a computer to perform a method comprising:

in an open systems environment wherein a plurality of backup hosts are connected to a plurality of virtual tape library servers (VTL servers) which in turn are connected to each of a plurality of disk library units (DLUs) thus providing scalable connectivity at both the front ends of the plurality of VTL servers to the plurality of hosts and at the back ends of the plurality of VTL servers to the plurality of DLUs, and wherein data is sent directly from the hosts to the VTL servers without intermediate disk cache or intermediate disk staging areas, accepting tape storage commands from heterogeneous hosts over channel network connections in a manner transparent to the hosts, said tape storage commands including commands in tape device format, each tape storage command identifying a target tape storage device; and upon receipt of a tape storage command:

emulating, as a corresponding virtual tape storage device, the target tape storage device identified in the tape storage command by converting the tape storage command into one or more disk storage device commands as a function of the virtual tape storage device; and forwarding the disk storage device commands to one or more disk storage devices, wherein the tape storage commands further include commands in robotics formats, and wherein the step of emulating includes a model describing a tape library including robotics and tape drive devices, including the emulated target tape storage device, whereby emulation of the target tape storage device comprises emulating the tape drive devices and robotics, wherein all of the VTL servers are coupled to the same plurality of DLUs and are able to write directly to the same plurality of DLUs, wherein tape storage commands simultaneously streaming from the plurality of backup hosts are accepted by multiple of the VTL servers, where the multiple VTL servers receiving the simultaneously streamed commands write to the same DLU.

\* \* \* \* \*